(12) United States Patent
de Greef (10) Patent No.: US 8,836,770 B2
(45) Date of Patent: Sep. 16, 2014

(54) 3D DISPLAY

(75) Inventor: Petrus Maria de Greef, Waalre (NL)

(73) Assignee: NXP, B.V., Eindhoven (NL)

( * ) Notice: Subject to any disclaimer, the term of this patent is extended or adjusted under 35 U.S.C. 154(b) by 535 days.

(21) Appl. No.: 12/956,958

(22) Filed: Nov. 30, 2010

(65) Prior Publication Data

US 2011/0292184 A1 Dec. 1, 2011

(30) Foreign Application Priority Data

Nov. 30, 2009 (EP) .................................... 09177512

(51) Int. Cl.
*H04N 13/04* (2006.01)
*G09G 3/34* (2006.01)

(52) U.S. Cl.
CPC ..... *H04N 13/0497* (2013.01); *G09G 2310/024* (2013.01); *G09G 3/342* (2013.01); *H04N 13/0438* (2013.01)
USPC .......................................................... 348/51

(58) Field of Classification Search
USPC .......................................................... 348/51
See application file for complete search history.

(56) References Cited

U.S. PATENT DOCUMENTS

2002/0196199 A1* 12/2002 Weitbruch et al. ................ 345/6
2004/0136204 A1 7/2004 Asao
2005/0063029 A1* 3/2005 Khazova et al. ................... 359/3
2006/0072006 A1* 4/2006 Lin et al. .......................... 348/51
2007/0206280 A1* 9/2007 May et al. ...................... 359/443
2008/0001911 A1 1/2008 Kim
2008/0018588 A1 1/2008 Yoshihara et al.
2010/0165079 A1* 7/2010 Yamada .......................... 348/43
2010/0289883 A1* 11/2010 Goris et al. ..................... 348/56

FOREIGN PATENT DOCUMENTS

| EP | 1 231 589 A1 | 8/2002 |
| EP | 1 271 965 A1 | 1/2003 |
| WO | 2006/103611 A2 | 10/2006 |
| WO | 2009/069026 A1 | 6/2009 |

OTHER PUBLICATIONS

Extended European Search Report for Patent Appln. No. 09177512.2 (May 3, 2010).

* cited by examiner

*Primary Examiner* — Sath V Perungavoor
*Assistant Examiner* — Jeffery Williams (57) ABSTRACT

A method of operating a stereo display device comprises addressing a display such that a stereo image is addressed in one field period by presenting left and right eye images in sequence with line-by-line addressing. A backlight is controlled in line-by-line manner with a different addressing rate to the addressing rate of the images. A shutter arrangement for a viewer is controlled by opening a shutter associated with one eye of the viewer when the respective image is displayed.

20 Claims, 13 Drawing Sheets

3D DISPLAY

This application claims the priority under 35 U.S.C. §119 of European patent application no. 09177512.2, filed on Nov. 30, 2009, the contents of which are incorporated by reference herein.

This invention relates to 3D displays, and in particular to displays in which the user wears active glasses which serve to select the image for presentation to the left and right eyes.

BACKGROUND OF THE INVENTION

There a number of different designs of 3D display systems. These generally fall into two categories; those that require the user to wear special glasses and those that do not.

3D display technologies which avoid the need for glasses include displays with switchable barrier arrangements, and displays with lenticular arrays. These generate different views in different directions. However, the resolution of the views is greatly reduced if there are many different images projected in different directions, and the position of the viewer is critical in achieving the desired 3D effect.

Systems which require the use of glasses overcome these problems. A viewer can be positioned anywhere within the field of view, and a full resolution image can be presented to each eye in a time sequential manner or else two views can be presented simultaneously with reduced resolution (for example with different polarizations).

For 3D LCD TV applications, the so-called active shutter glasses option has great advantages, as in 2D viewing mode the display system is not compromised in quality, power efficiency and cost. The display does not need to provide special polarizations as in a polarization based system, and full colour 3D can be achieved, unlike systems using colour filtering. Any fast LCD display panel can be used, with only an adapted control method required.

The active shutter design provides sequential images to the left and right eye, and the glasses provide a shutter over one eye to block the wrong image. During addressing of a new field, the shutter glasses can be used to block the light towards both the left and right eyes. To reduce energy wastage, the backlight can be turned off during this period.

In the 3D viewing mode, low brightness is a problem with this design, as the stereoscopic viewing method blocks more then 50% of the light. The implementation requires a relatively small time window when an eye is receiving an image, so that the efficiency of the actual implementation also has losses of about 50%. This reduces light output from the desired 500 Cd/m$^2$ down to 125 Cd/m$^2$.

The invention aims to improve the light transmission of the overall stereoscopic display system. The obvious solution is to provide a brighter backlight, but this results again in high power consumption and low efficiency. There is therefore a need for improved efficiency and brightness by redesigning the optical system.

SUMMARY OF THE INVENTION

According to one aspect of the invention, there is provided a stereo display device comprising:
a display panel;
a backlight having independently addressable portions;
a shutter arrangement for a viewer, having independently controllable shutters for the two eyes of the viewer; and
a controller for controlling the addressing of the display such that a stereo image is addressed in one field period, and for controlling the timing of operation of the shutters, wherein the controller is adapted to address the display to present left and right eye images in sequence, and to control the backlight, wherein the images are addressed line by line and the backlight is operated in line-by-line manner with a different addressing rate to the addressing rate of the images.

The arrangement uses a scanning backlight. This enables the backlight exposure time of the LCD panel to be stretched, for example enabling doubling of the optical transmission.

The line-by-line operation of the backlight does not need to be with the same resolution as the lines of pixels of the display. Instead, the backlight is divided into row-shape portions which can be addressed in a sequence. There may for example be 10 backlight row segments, whereas the display may typically have up to 1080 rows of pixels. The invention enables less light to be wasted, so the desired brightness can be achieved without the need for significant extra energy.

The backlight can be addressed at twice the image addressing rate. It may be addressed faster, for example at 1.5 times this rate hence creating a time interval. This reduces vertical optical cross talk.

The field period is divided into sub-fields which are allocated to the different sequential images making up the field period.

Each field can comprise:

(i) One left image and one right image and the scrolling backlight is illuminated for 0.4-0.6 times the duration of the period allocated to the respective image. This enables the maximum luminance in the 3D mode to be increased to around 25% of that of the 2D mode; or (ii) A left image addressed twice in succession and a right image addressed twice in succession and the scrolling backlight is illuminated for 0.6-0.9 times the duration of the combined period allocated to the respective image. This enables the maximum luminance in the 3D mode to be increased to around 37% of that of the 2D mode.

In a further modification, each field can comprise:

(i) one left image, one common image and one right image and the shutters are controlled to allow light to both eyes during the display of the common image. This enables the maximum luminance in the 3D mode to be increased to around 42% of that of the 2D mode and is suitable for 180 Hz systems; or (ii) one left image, two common images and one right image and the shutters are controlled to allow light to both eyes during the two common images. This enables the maximum luminance in the 3D mode to be increased to around 50% of that of the 2D mode and is suitable for 200 Hz or 240 Hz systems; or (iii) two left images, one common image and two right images and the shutters are controlled to allow light to both eyes during the common image. This enables the maximum luminance in the 3D mode to be increased to around 50% of that of the 2D mode and is suitable for 250 Hz systems.

By introducing an extra common sub-field or multiple common sub-fields, both shutters can be opened during this sub-field, again increasing the optical transmission. The common sub-field can also reduce flicker and improve the overall 3D experience.

The controller can be adapted to control the fractions of the frame period allocated to expose the left image or images the right image or images and the common image or images. This can be adaptive depending on the image content so that optimum brightness can be achieved as a function of image content.

In one version, the backlight is controlled such that at any given time, all illuminated portions of the backlight are for presenting the same image. This reduces cross talk. However additional brightness can be achieved by controlling the backlight such that at any given time, a first set of illuminated portions of the backlight for presenting the same image are at a first brightness and a second set of illuminated portions of the backlight for presenting the next or previous image or during addressing of the same image or the next or previous image are at a second lower brightness.

According to a second aspect of the invention, there is provided a stereo display device comprising:

a display panel;

a backlight;

a shutter arrangement for a viewer, having independently controllable shutters for the two eyes of the viewer; and a controller for controlling the addressing of the display such that a stereo image is addressed in one field period, and for controlling the timing of operation of the shutters, wherein the controller is adapted to address the display to present left and right eye images in sequence, wherein each field comprises at least one left image, at least one common image and at least one right image and the shutters are controlled to allow light to both eyes during the common image or common images.

This aspect is directed to the use of common images, but does not require a scrolling backlight.

The first aspect of the invention also provides a method of operating a stereo display device, comprising:

addressing a display such that a stereo image is addressed in one field period by presenting left and right eye images in sequence with line-by-line addressing;

controlling a backlight in line-by-line manner with a different addressing speed to the addressing speed of the images; and controlling a shutter arrangement for a viewer by opening a shutter associated with one eye of the viewer when the respective image for that eye is displayed.

The second aspect of the invention also provides a method of controlling a stereo display device, comprising:

addressing a display such that a stereo image is addressed in one field period by presenting at least one left image, at least one common image and at least one right image controlling a shutter arrangement for a viewer by opening a shutter associated with one eye of the viewer when the respective image for that eye is displayed and opening the shutters for both eyes of the viewer during the common image or common images.

These methods can be implemented by computer programs.

BRIEF DESCRIPTION OF DRAWINGS

The present invention will now be described, by way of example, with reference to the accompanying drawings, wherein.

In the drawings the same reference numerals have been used to indicate corresponding features.

A TV sequentially displays images, typically at 50 (PAL) or 60 (NTSC) images per second. An image is divided into one or more sub-fields, which together reproduce an image as perceived by the viewer. The process of displaying a sub-field can be divided in 2 stages: writing image-data to the display elements (addressing) and light generation by these elements. For the stereoscopic viewing experience, each image comprises slightly different information to be viewed by either the left or the right eye. These images may have been captured by a stereo camera or rendered by a graphics engine.

In a stereo sequential display system, active shutter glasses are used to differentiate the left images from the right images. By shutting the optical transmission of either the left or right glass of the glasses, the sequentially displayed sub-fields are captured by either the left or right eye. Each of the two glasses may comprise a single LC-cell, controlled by a circuit synchronous with the display panel, which can block light transmission.

After a complete image (one sub-field) has been addressed, a light burst (e.g. 10% duty cycle) creates an image of all pixels on either the left or right eye, selected by the shutter glasses. A faster addressing period enables the duty cycle to be increased to create more brightness, but this is insufficient to compensate for the brightness difference between 2D and 3D viewing modes.

Increasing the light capacity of the backlight would enable more brightness, but this is an expensive solution and one which is power inefficient.

The invention provides a solution for improved stereoscopic (3D) image reproduction on fast display systems in combination with shutter glasses. One approach is to make use of a scanning backlight, and another is to add one or more common sub-fields, enabling a more transparent optical system, with the common image exposed to both the left and right eye. This requires a method of calculating the content of the common sub-fields and modified left and right sub-fields, such that the common and left sub-fields provide an optimal 3D image for the left eye and the common and right sub-fields provide an optimal 3D image for the right eye. These two approaches can be combined or used independently.

Figure 1:
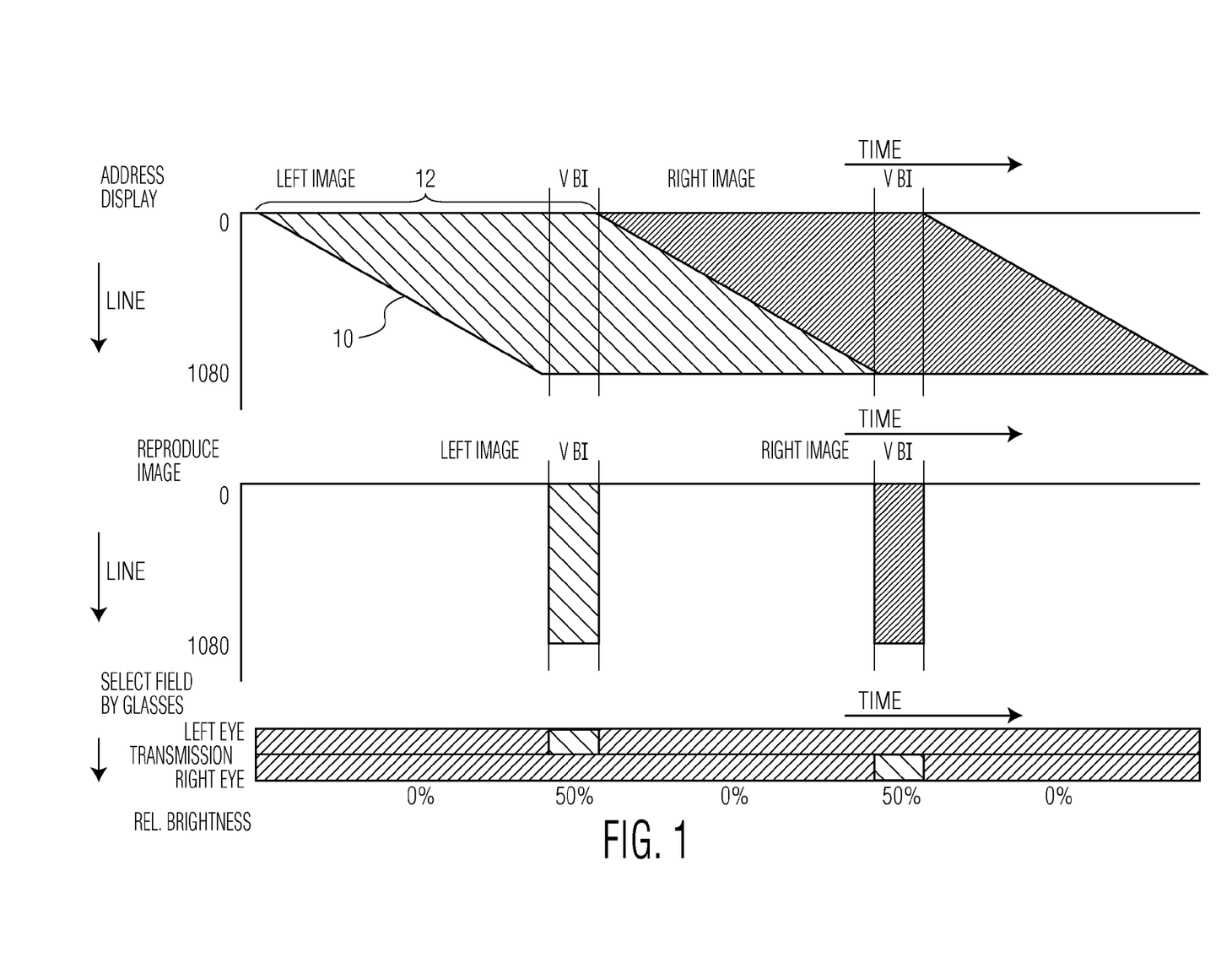
FIG. 1 shows a timing diagram for a first known shutter 3D display.

FIG. 1 shows a first known way of operating a stereoscopic display system with shutter glasses:

The top plot shows the line-by-line addressing of the two sequential images. The lines are addressed in turn (hence the sloping edge 10), and remain addressed for a period 12. The bottom plot shows the backlight activation during the vertical blanking intervals VBI. These are time periods during which an image is fully addressed and static on the display. Vertical blanking originates from the transmission standards and initially corresponds to the fly-back time of CRT tubes, for LCD panels this period can be modified. The backlight is illuminated when the full image has been addressed into the display. The bottom plot shows the relative brightness perceived by the viewer during the period of illumination (100% representing light provided to both eyes and 50% representing light provided to one eye only). As shown, there is a short duration period of 50% brightness (to one eye) and subsequent short duration period of 50% brightness (to the other eye). These take place during the vertical blanking periods (VBI).

The basic sequential stereoscopic display runs at twice the image rate of the 3D video source, which is typically 50 or 60 Hz. Thus, a 120 Hz display is used. This corresponds to a panel addressing and vertical blanking period (VBI) of respectively 10 ms or 8.3 ms. The vertical blanking is often about 10% of this period and these cycles are used for the exposure of the left respectively the right eye. This leads to a luminance efficiency of only 5%.

During the addressing, the display system produces no light. The glasses also act as light blocks during this period.

Compared to the 2D viewing mode the maximum luminance has reduced to only 5%. 90% of the time images cannot be reproduced, as the left as well as the right image are both partially imaged on the display panel during addressing.

As the ambient light is also modulated by the shutter glasses, flicker is visible at the toggle frequency (of the individual shutters), which is typically 50 or 60 Hz. The applicant has proposed that the shutter glasses can be opened one or more extra periods per input image, when the display is not reproducing images. In this way the flicker-frequency of the ambient light can be tuned to e.g. a 2 or 3 times higher frequency, where is human eye is not sensitive for flicker anymore. This also reduces the interference with flickering light sources like incandescent or fluorescent lamps.

Figure 2:
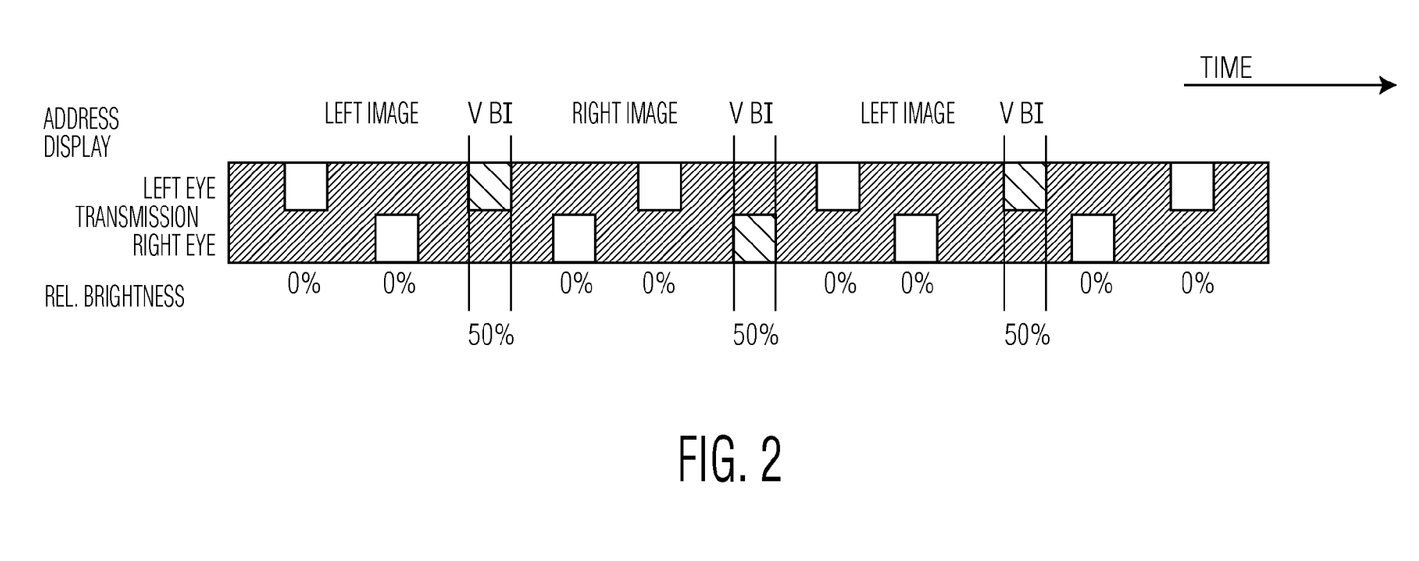
FIG. 2 shows a new way to reduce flicker in the scheme of FIG. 1.

Thus approach is shown in FIG. 2. The backlight is only illuminated for the 50% brightness periods (shown dotted). The other open shutter periods allow only ambient light to reach the viewer as the backlight is off.

Figure 3:
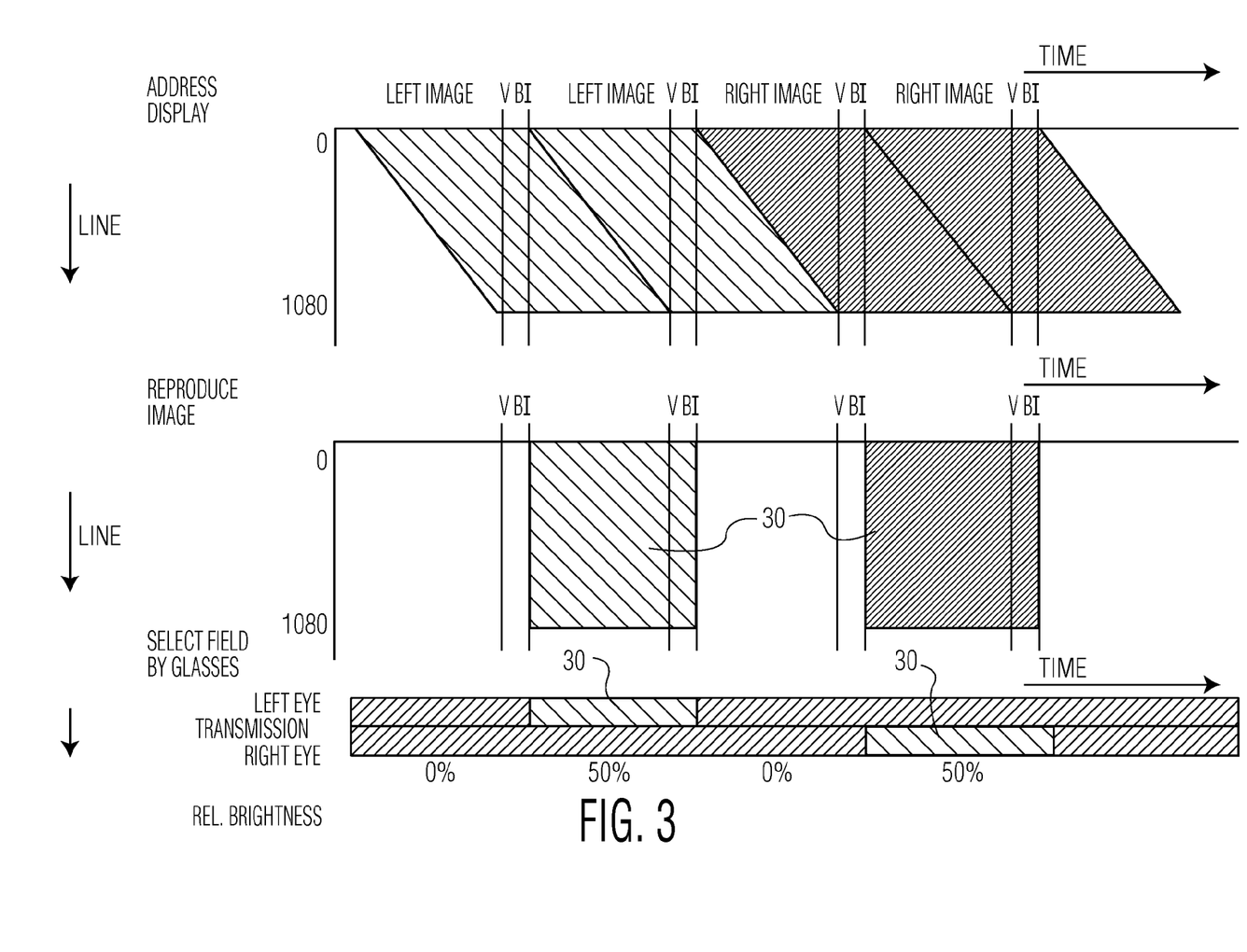
FIG. 3 shows a timing diagram for a second known shutter 3D display.

FIG. 3 shows a second known way of operating a stereoscopic display system with shutter glasses.

This is for a more advanced sequential 240 Hz stereoscopic display, which addresses as fast as possible, enabling a longer time for image exposure. Such a display may run at four times the image rate of the 3D video source, which is typically 50 or 60 Hz.

FIG. 3 shows the same plots as in FIG. 1. As shown, each image is addressed twice in succession. During the second addressing cycle, the image content does not change, so the image can be exposed to the user during this second addressing period.

This frequency corresponds to a panel addressing and vertical blanking period (VBI) of respectively 5 or 4.2 ms. The vertical blanking of often about 10% of this period and is now used as settling time for the lines recently addressed at the bottom of the image. For LCD display systems, a repeated addressing of the image data improves the picture quality. During the complete repeated addressing period the backlight can expose the panel, shown as period 30.

During the addressing from left to right and right to left (i.e. the first of the two sequential addressing operations), the display system produces no light (and the shutters are blocking)

Compared to the 2D viewing mode the maximum luminance has reduced to 25%. 50% of the time, images cannot be reproduced, because the left as well as the right image are both partially imaged on the display panel during the first addressing, and a small settling time is introduced to hide the slow LC response of pixels which where recently addressed.

A first approach of the invention is use a scanning backlight (otherwise known as a scrolling backlight), in which rows of pixels are illuminated in sequence. A horizontal band of illumination is provided by the backlight, which scrolls vertically.

Figure 4:
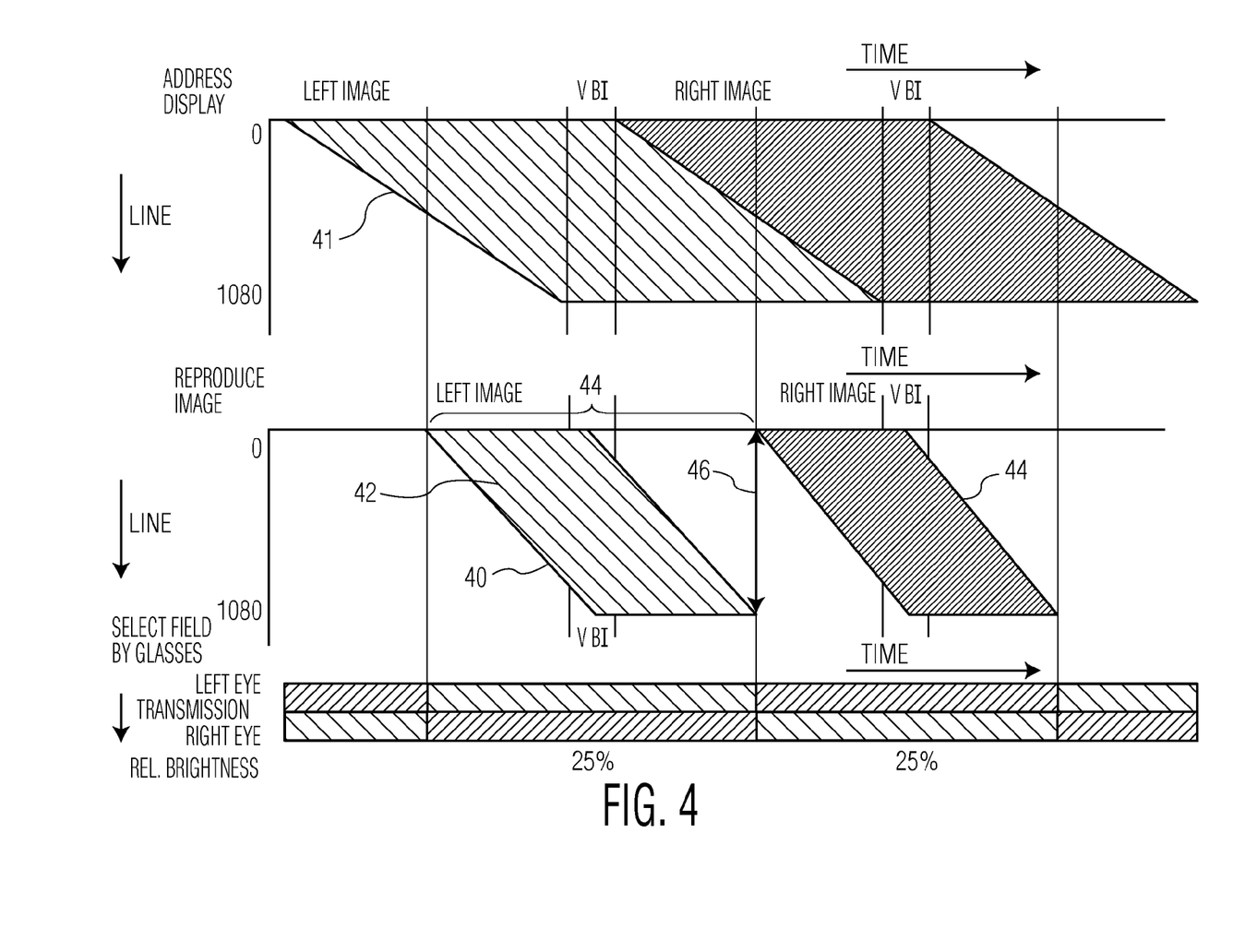
FIG. 4 shows a timing diagram for a first example of shutter 3D display of the invention.

FIG. 4 shows an example of 120 Hz display with scanning backlight. FIG. 4 shows the same plots as in FIG. 1. The image is addressed in the same manner as in FIG. 1. Thus, the sequential stereoscopic display runs at twice the image rate of the 3D video source, which is typically 50 or 60 Hz. This corresponds to a panel addressing and vertical blanking interval (VBI) of respectively 10 or 8.3 ms.

The exposure period of the left and the right eye can be extended by scanning the backlight synchronously to the addressing of the display panel (for transmissive displays). Each position on the display panel can now be exposed for a longer time. To limit the optical vertical crosstalk, the scanning backlight runs twice as fast as the addressing (i.e. the slope 40 is twice the slope 41).

The area 42 represents the time when the backlight is illuminated for the left image. The parts of the image which are illuminated are static during this time, whereas the non-illuminated parts of the image may be in the process of being addressed with new data. The same applies to the illumination 44 for the right image Taking the illumination window 42 for example, the time period has been extended (to period 44), but each line is only exposed for half of that time period. Hence, the relative brightness is 25% (one eye only and only illumination of each part of the image for half of the time).

Compared to the 2D viewing mode, the maximum luminance has reduced to 25%. A vertical separation between the addressed image and the previous/next backlight exposure is required to prevent crosstalk between the left and right sub-fields, and this is shown as 46.

Figure 5:
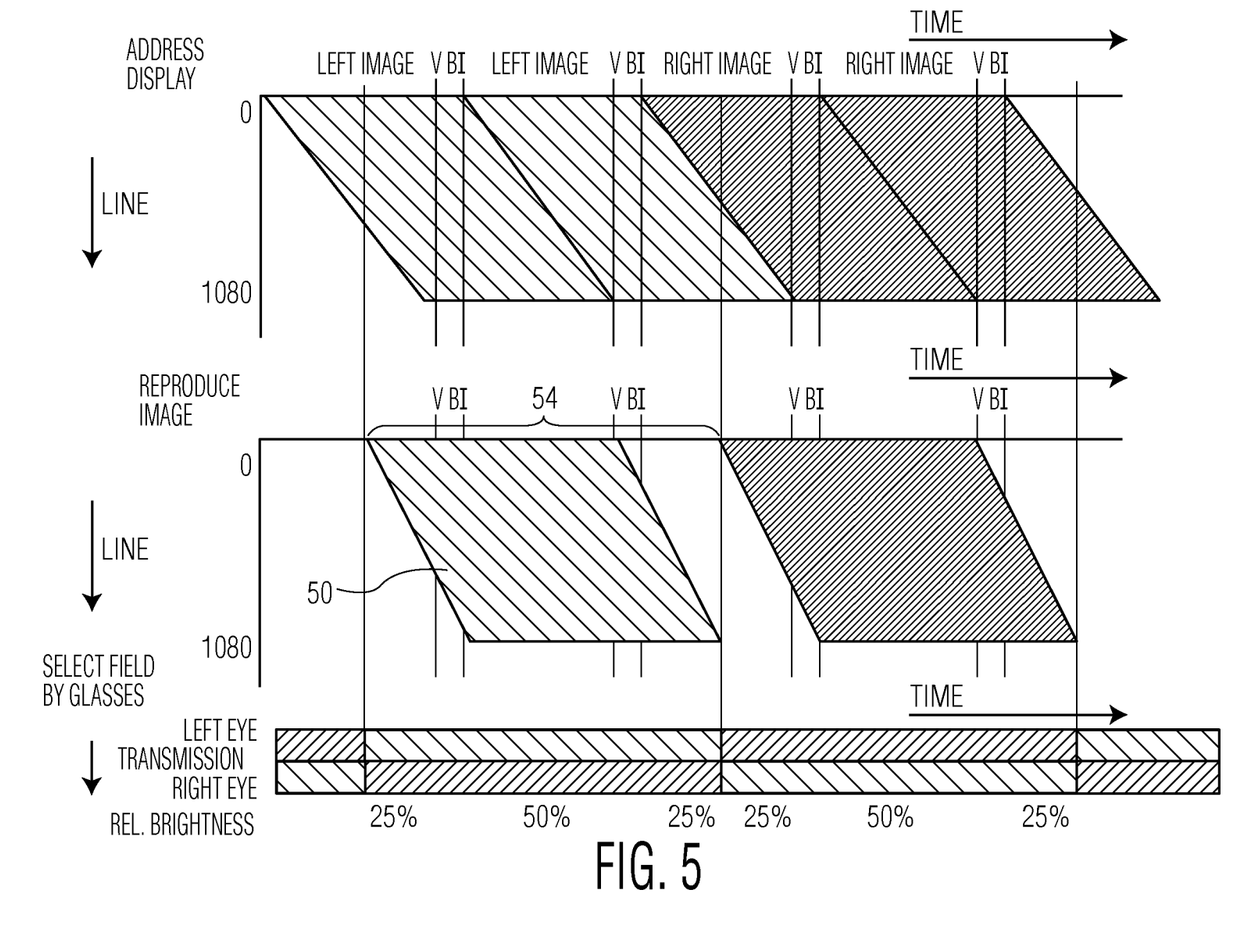
FIG. 5 shows a timing diagram for a second example of shutter 3D display of the invention.

FIG. 5 shows an example of 240 Hz display with scanning backlight. FIG. 5 shows the same plots as in FIG. 4. The image is addressed in the same manner as in FIG. 3.

As explained in connection with FIG. 3, the higher speed enables a longer time for image exposure. The repeated addressing of the image data as explained with reference to FIG. 3 improves the picture quality, but also enables the backlight to expose the panel both during the repeated imaging as well as during part of the addressing period.

In this case, the area 50 of illumination of the left image is increased to approximately 75% (compared to constant illumination of the full panel during time period 54). Each line is addressed for ¾ of this time period 54.

During the initial and final parts of the addressing, the panel has about 25% efficiency, the remaining time 50%. Compared to the 2D viewing mode the maximum luminance has reduced to 37%. Again, a vertical separation between the addressed image and the previous/next backlight exposure is required to prevent significant left/right crosstalk between sub-fields.

A second approach of the invention is to use an extra sub-field to improve the exposure time. This extra sub-field must expose both eyes, hence it should share only the common luminance of the left and right images. In the following, this is termed a common sub-field. The backlight for this sub-field can reach both eyes, and it enables a longer time for image exposure for each eye.

To implement this method, the display typically runs at 180 Hz or 240 Hz. The spare 5 or 4.2 ms vertical blanking interval can be distributed over the 3 sub-fields to adaptively stretch the period for image reproduction and hence boost luminance over the full field period.

Figure 6:
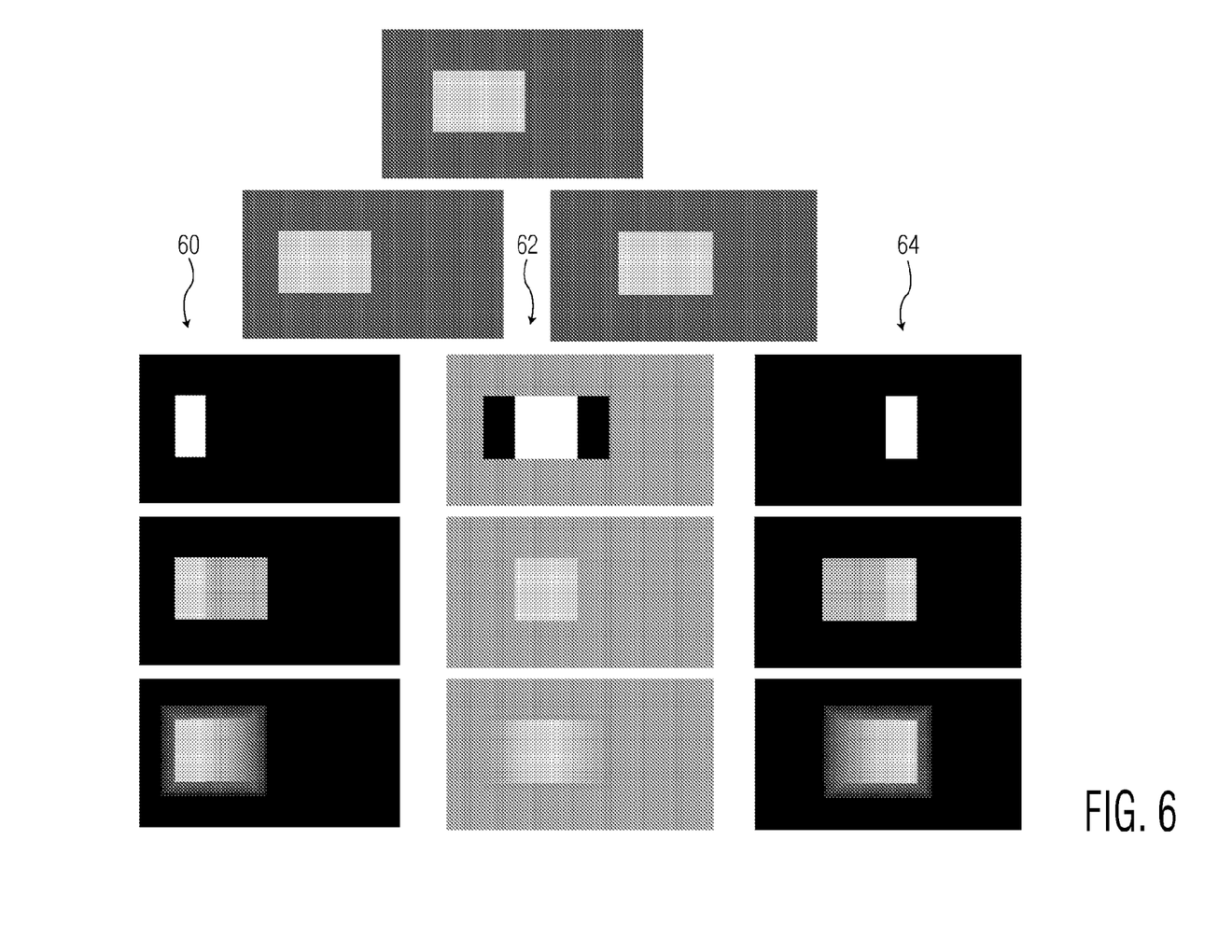
FIG. 6 is used to explain the concept of common images used in further examples of shutter 3D display of the invention.

The concept of a common sub-field is explained with reference to FIG. 6.

The top image shows a 2D image of a light grey block on a dark grey background (left and right eye see the same view).

The second row of images show left and right views of a 3D image with depth; again a light grey block on a dark grey background. The blocks are in a different position relative to the outer boundary of the image as a result of the different perspective views.

The third and fourth rows of images show examples of sub-fields named "delta_left" 60 (the left image content which is not common with the common image), "common" 62 and "delta_right" 64 (the left image content which is not common with the common image). In the case of a rectangle, the middle part is common to both left and right images. This middle part has the right boundary of the left image and the left boundary of the right image. As can be seen, the combined images can be formed in a number of ways.

The bottom row represents the same images for an LCD module with a local dimming backlight. When the 3D contours of the delta_left and delta_right sub-fields require a bright backlight exposure, the adjacent pixels of this sub-fields are also driven to brighter levels, combined with dimmer levels for the related of pixels in the common sub-field, saving energy.

Figure 7:
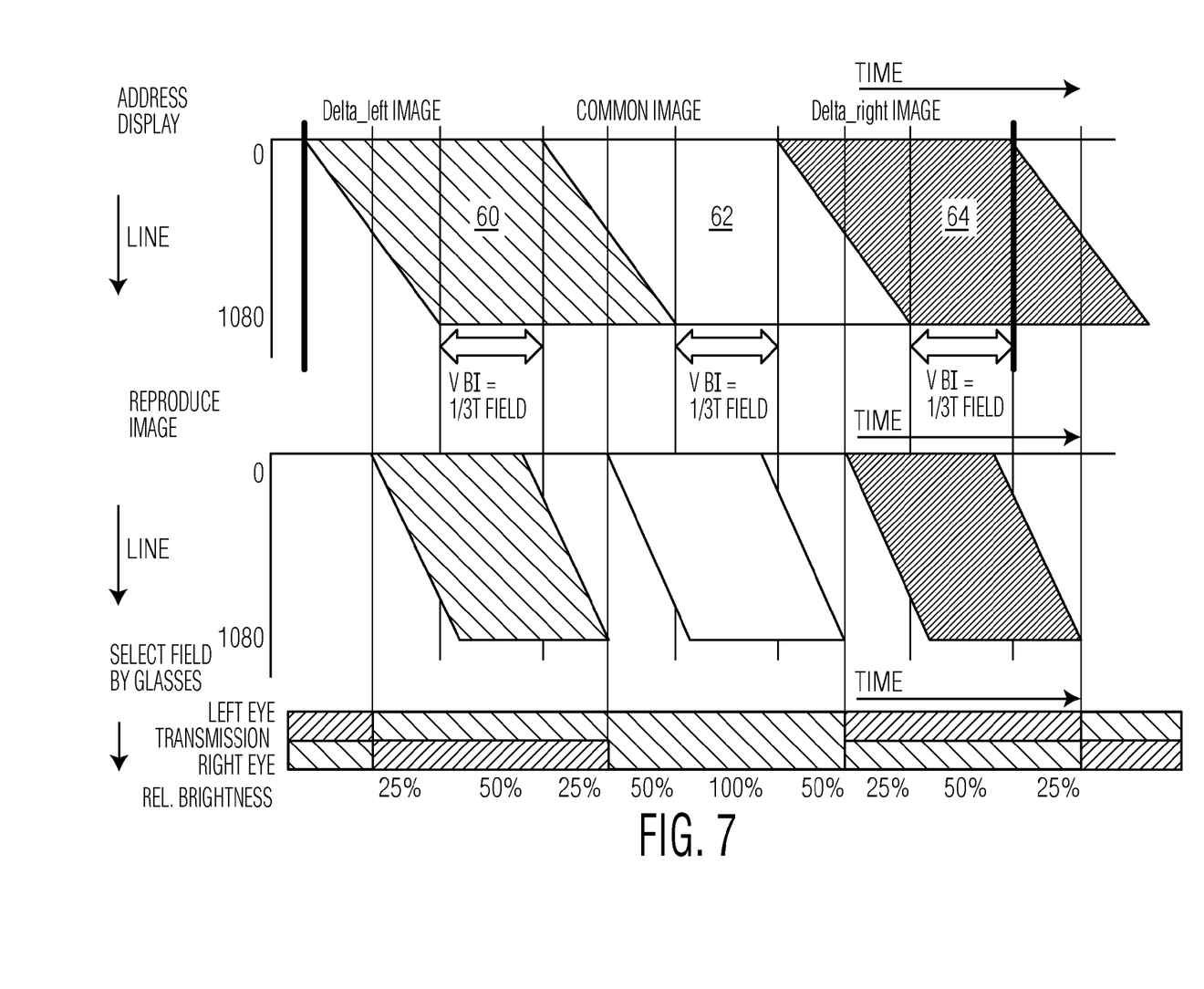
FIG. 7 shows a timing diagram for a third example of shutter 3D display of the invention.

FIG. 7 shows a first example of this approach for a 180 Hz display.

The addressing sequence provides the delta_left image, then the common image, then the delta_right image. As with all examples above, the backlight scanning is carried out faster as the addressing of the image.

The exposure of the panel by the backlight can be flashing or scanning, synchronous to the addressing of the display panel. During the common sub-field, the backlight can expose the panel with twice the power efficiency as both eyes are exposed by the displayed common image.

The relative brightness has profiles that correspond to those shown in FIG. 5 for the left and right delta images, but with an additional central common image with double the relative brightness.

Compared to the 2D viewing mode the maximum luminance has only reduced to 42%. The vertical separation between the addressed image and the previous/next backlight exposure is again required to prevent significant left/right crosstalk between the sub-fields, but this is less needed for the common sub-field. This allows the exposure period to be stretched without introducing significant left/right crosstalk.

Figure 8:
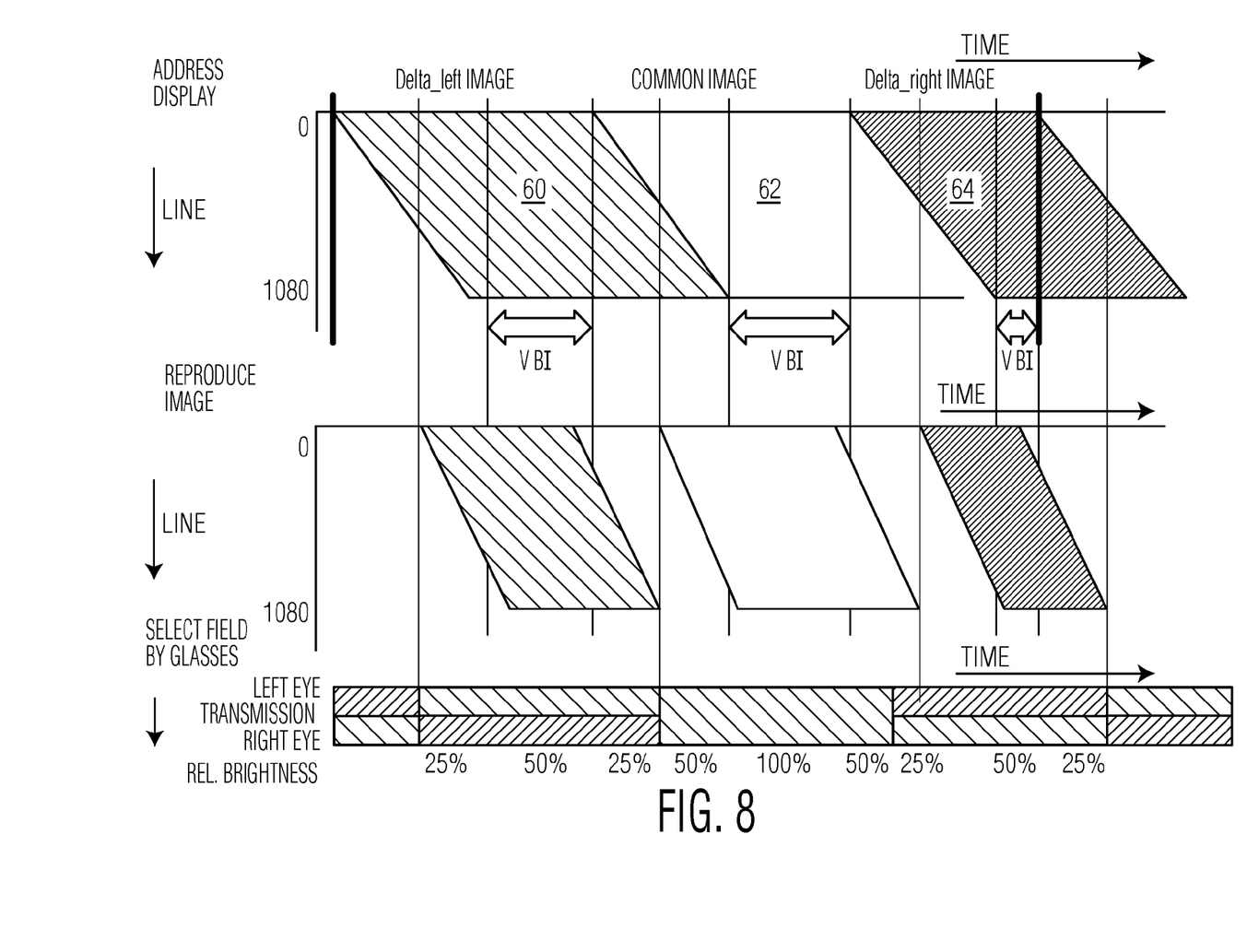
FIG. 8 shows a timing diagram for a fourth example of shutter 3D display of the invention.

FIG. 8 shows a modification to the 180 Hz design of FIG. 7 in which an adaptive common sub-field is employed (explained below).

In this modification, the time period allocated to the delta_left, common and delta_right images can be varied depending on image content.

In FIG. 8, the common sub-field has been lengthened and the delta_right image has been shortened.

In this case, compared to the 2D viewing mode, the maximum luminance has only reduced to about 50% as the image reproduction weight of the Delta_left, Delta_right and common sub-fields has be modulated to lengthen the common sub-field, depending on the image content.

In both examples, in the case of image disparity, required to create the 3D stereoscopic experience, bright pixels must be able to appear only in the delta_left and delta_right view, as the common sub-field might not create any luminance. In this condition, extra local brightness due to a boosting backlight will help to create an appropriate brightness on the left and right eye.

In order to obtain this 50% of 2D viewing mode brightness a factor 2 luminance gain for the bright image-data of the delta_left and delta_right sub-fields is required to compensate for the missing luminance due to the extra addressing period. Furthermore:

Local gain of the video-data can be employed (some clipping can be tolerated)

Local control of the gain of the of backlight output can be employed by increasing the power (boost)

The duty cycle can be stretched towards the common sub-field.

It is also possible to locally attenuate the backlight output where light is not required, to save power and reduce temperature. The extra common sub-field has the advantage also of reducing 50/60 Hz image flicker.

Figure 9:
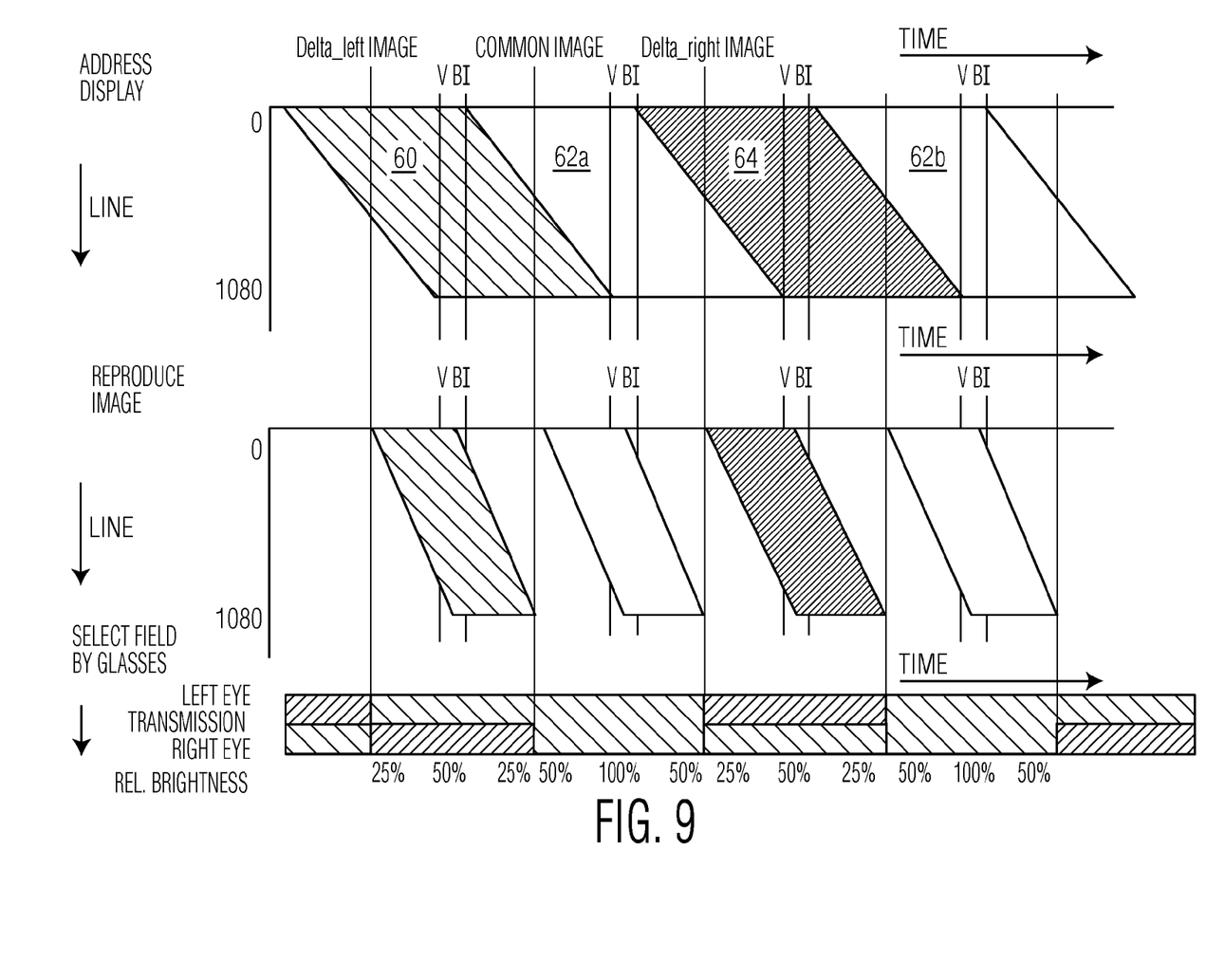
FIG. 9 shows a timing diagram for a fifth example of shutter 3D display of the invention.

The design of FIG. 8 can be modified to use two common sub-fields 62*a*,62*b*, in a 240 Hz system. Four sub-fields are then used to improve the exposure time as shown in FIG. 9.

The extra sub-fields must expose both eyes, hence share only the common luminance of the left and right sub-field. The scheme is particularly suitable for 50 Hz 3D sources on a 240 Hz display, as it changes visible 50 Hz image flicker into flicker-free 100 Hz.

This implementation is comparable to the example of FIG. 8, but with the common sub-field stretched to twice the length of the delta sub-fields, but with the common sub-field split into two sections, interleaved with the left and right delta sub-fields.

Compared to the 2D viewing mode the maximum luminance has reduced to about 50%.

Figure 10:
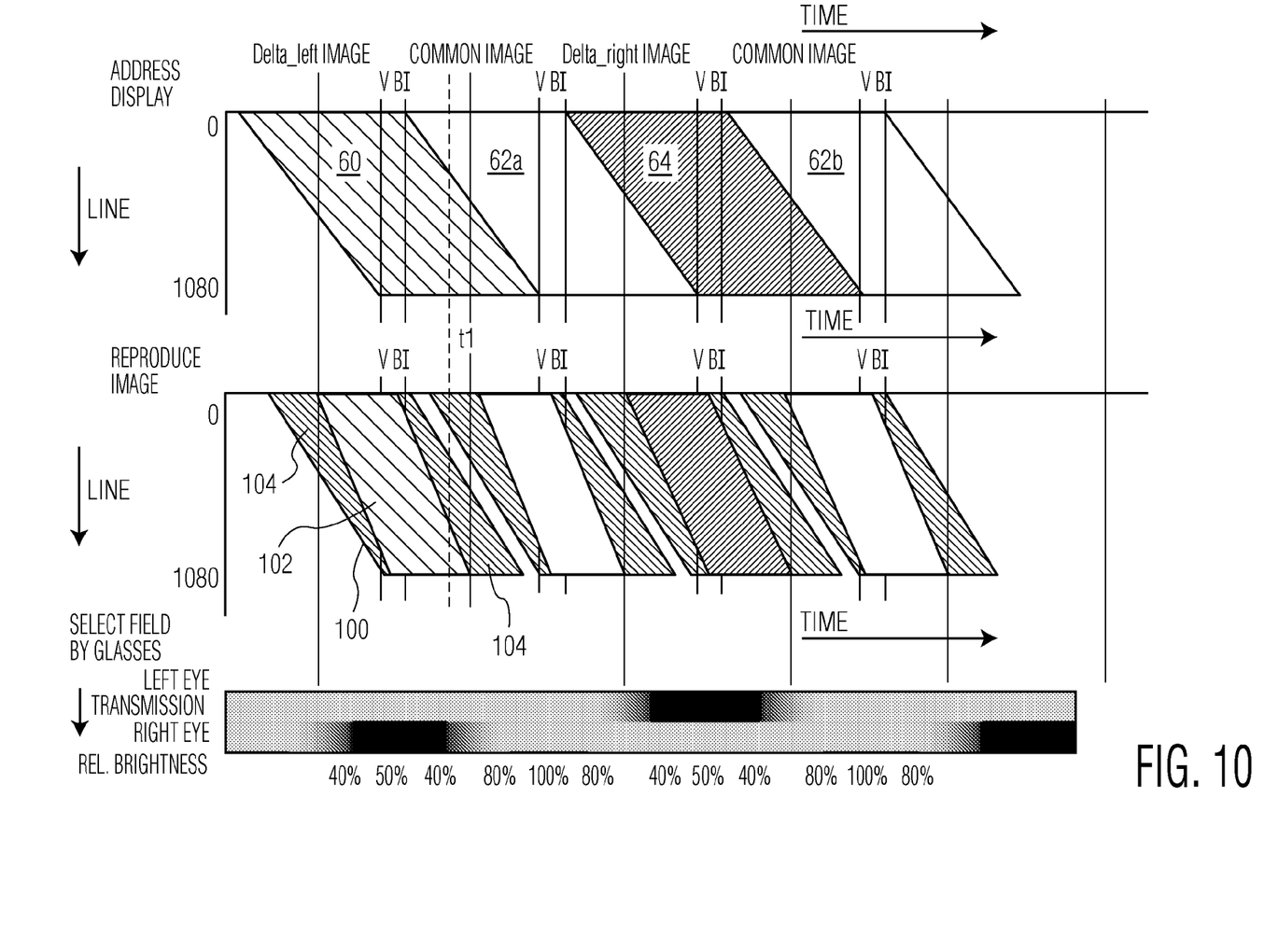
FIG. 10 shows a timing diagram for a sixth example of shutter 3D display of the invention.

FIG. 10 shows a modification to FIG. 9 in which the backlight provides additional luminance during the addressing cycle. Taking the delta_left image as an example, the backlight output has time profile 100. Part of this 102 is at full brightness, and as in previous examples, the timing is such that a part of only one image is ever illuminated at a given time, and a guard time is provided between illumination of one line and illumination of a nearby line with a new image.

Another part 104 is at reduced brightness. There is illumination during addressing to boost the luminance which has a smooth transition from 0 luminance towards the luminance level of part 102. This can lead to some optical cross talk. For example at time t1, the lower part of the display is displaying the delta_left image, but the top part is being addressed with the common image, and this is visible to the viewer. This error can be partially compensated in the video domain.

Compared to the 2D viewing mode the maximum luminance has reduced only to about 75%. For average video-content, an adaptive local luminance dimming algorithm can be applied reducing the required backlight brightness about 50% on average, hence the need for stretching the image reproduction period of the sub-fields to create extra luminance in part 102 will not occur frequently and related artefacts will not often occur.

Boosting the backlight luminance can further enhance the brightness of left, right and common sub-fields, depending on the luminance distribution across the sub-fields. The smooth transition period of switching shutter glasses depends on the amount of boosting.

Figure 11:
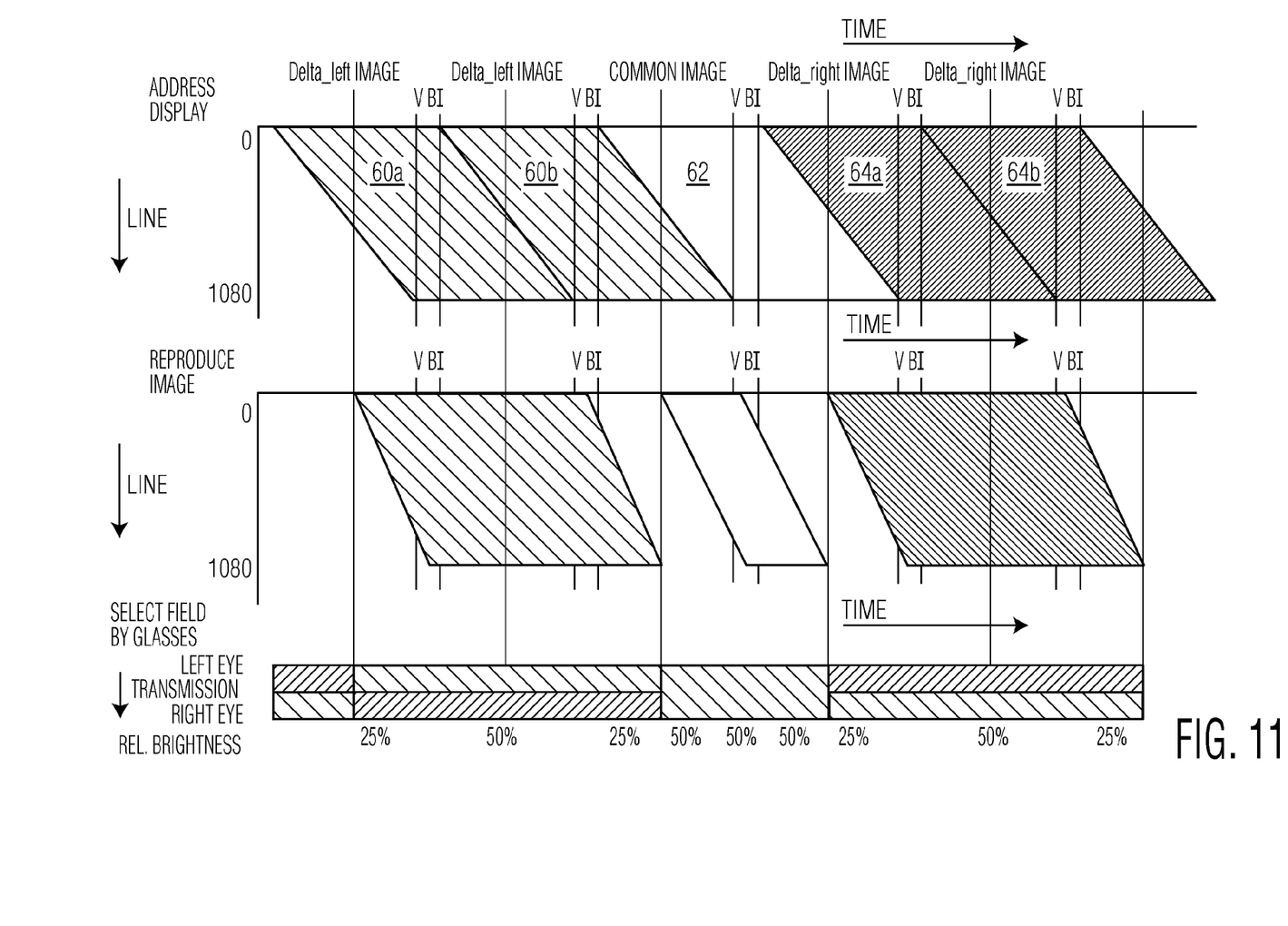
FIG. 11 shows a timing diagram for a seventh example of shutter 3D display of the invention.

A further example in FIG. 11 is a 250 Hz system using one common sub-field. This system uses five sub-fields to improve the exposure time. A duplicated delta-left and delta-right sub-field 60*a*,60*b* and 64*a*,64*b* are provided and a single extra common sub-field 62. The scheme is particularly suitable for 50 Hz 3D sources on a 250 Hz addressable display.

The double-addressing of the delta_left and delta_right sub-fields enables a long illumination time in the same way as explained with reference to FIG. 5. The common sub-field further increases the exposure in the same way as explained above.

In this case, compared to the 2D viewing mode the maximum luminance has reduced to almost 50%. The amount of luminance which the delta_left and delta_right sub-field can generate is larger than the amount luminance which the common sub-field can generate, yet the common sub-field can be used to image part of the required luminance of the common image.

Figure 12:
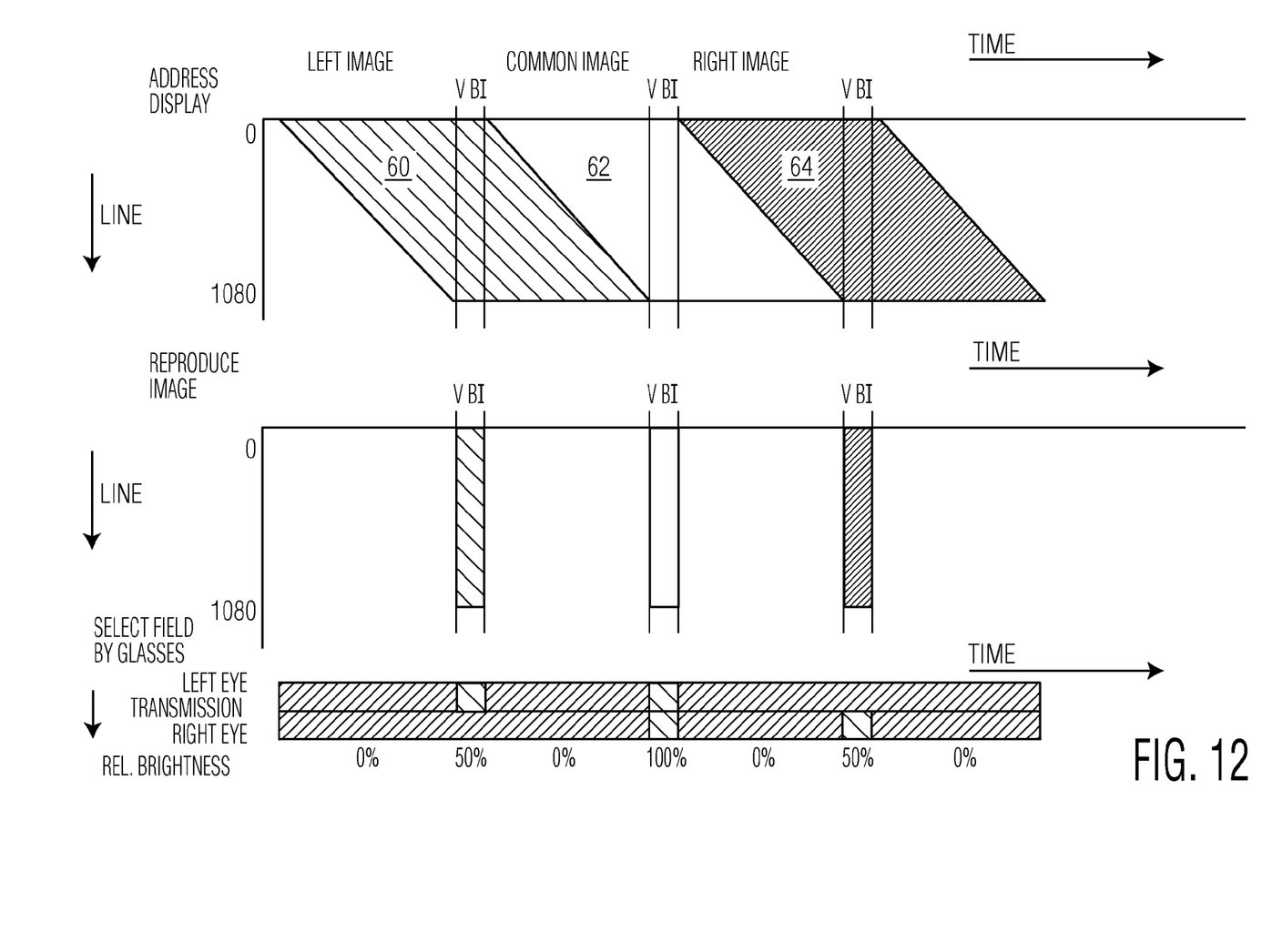
FIG. 12 shows a timing diagram for a eighth example of shutter 3D display of the invention.

The examples above all use a scanning or scrolling backlight. However, the idea of providing a common image can be used with a normal backlight. The timing diagrams for this approach are shown in FIG. 12.

Compared to FIG. 1, there is a third image in the field period, and during the corresponding vertical blanking interval, both shutters can be opened. This represents a doubling of light output compared to FIG. 1, but this is nonetheless much less significant than the increases in brightness that can be achieved with the additional use of a scrolling backlight as explained in the examples above.

Figure 13:
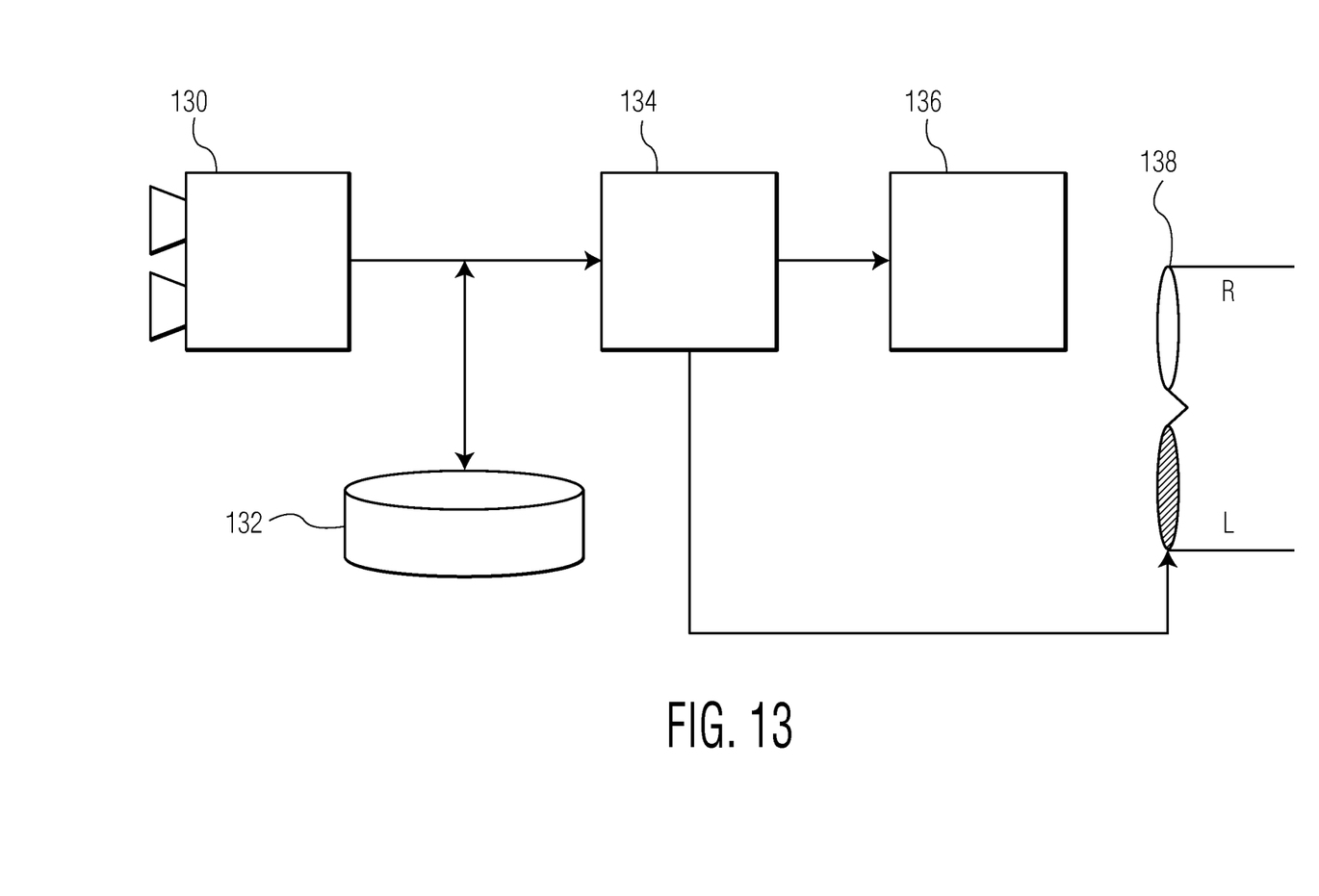
FIG. 13 shows an example of the apparatus of a shutter 3D display of the invention.

The invention can be implemented with modification to the control of a segmented backlight (if provided) and the addressing scheme. Thus, minor modification to existing systems is required. By way of example, FIG. 13 shows the basic elements of a 3D display system which can be used to implement the invention.

A stereo camera 130 is used to collect left and right images. The system has storage 132 and a display processor 134 which provides the data to the field sequential stereo display panel 136 (including backlight, not shown separately) as well as controlling the shutter timing of the glasses 138.

When driving the display with a repeated left and right sub-field, there is plenty of time for settling the response of LC material to the desired transmission level. The repeated addressing improves the actual LC response, as overdrive schemes can be executed more accurately and the variations over the varying cell capacitance are compensated for.

The left and right sub-fields of a stereoscopic image are highly correlated, hence there will be a lot of bright pixels in the common sub-field. As the shared image content of the common sub-field is typically much brighter, a two times longer exposure of the common sub-field can help to create sufficient brightness. On the other hand this will increase the dynamic switching of the LC material when using the L-C-R-C-driving scheme. There is however no real need to concentrate the shared brightness in the common sub-fields. The brightness of the common sub-fields can be re-distributed over all sub-fields, with the intent to reduce the dynamics of the LC switching, and optimising the LC response hence reducing crosstalk between the sub-fields. This will enable a longer exposure time, which has a positive impact of the brightness.

When LC response and overdrive correction are combined with the stereoscopic driving scheme, the overall control over light generated by the left, right and common sub-fields can be optimized. This is possible as the shared brightness of the image-date can be freely distributed over the sub-fields.

Adjusted Backlight Dimming has been mentioned above. In the same way that local dimming improves the power efficiency of a normal LCD-TV, local dimming can reduce the power consumed by a stereoscopic display system when in a 2D view mode as well as in 3D view mode.

After the left and right sub-fields have been compensated for the image provided by the common sub-fields, these images typically comprise a limited amount of light, concentrated in small bright contours. These contours demand the local backlight to be very bright. As the optical path has large losses and there is limited time for exposure, this locally generated light should be used in an optimal way by driving the pixels in the adjacent areas more transparent, without demanding more luminance from the backlight. This extra light generated by the images of the left and right sub-field can be subtracted from the image of the common sub-fields, reducing the local brightness and backlight luminance in these sub-fields, saving even more power.

The invention can be used in combination with RGBW LCD panel technology to save power in 2D as well as 3D viewing mode, providing power efficiency in the 3D mode close to state-of-the-art LCD-TV. The invention can also be applied to projection displays, like DLP and some aspects can also be applied to sub-field sequential emissive displays, like PDP. The invention can also be applied to emissive displays, like CRTs as well as OLED displays (of course in this case the display output is scanned rather than the backlight output as OLED displays are emissive displays with sample and hold properties).

The efficiency of the method, specifically when applied to OLED displays panels is very important, as these displays typically have severe brightness and lifetime constraints. The ability to create extra brightness without consuming extra energy is valuable. Specifically in the 4-sub-field addressing mode the delta_left and delta_right sub-fields should be able to provide a lot of light on the depth-contouring image-data, yet the average power on these sub-fields is always very low, reducing panel stress.

The additional opening of shutters to reduce flicker as explained with reference to FIG. 2 as proposed by the applicant can be employed in combination with the other approaches of the invention.

The required algorithms can be implemented on existing video processors, which are already used for driving 200 and 240 Hz display panels, to render various 3D input formats to stereoscopic display formats and local dimming and boosting.

The invention provides improved brightness, specifically of image-data without depth and large bright areas. Improved power efficiency is provided during the common sub-fields.

In the present specification and claims the word "a" or "an" preceding an element does not exclude the presence of a plurality of such elements. Further, the word "comprising" does not exclude the presence of other elements or steps than those listed.

The use of any reference signs placed between parentheses in the claims shall not be construed as limiting the scope of the claims.

From reading the present disclosure, other modifications will be apparent to persons skilled in the art. Such modifications may involve other features which are already known in the design, manufacture and use of MEMS resonators and component parts therefor and which may be used instead of or in addition to features already described herein.

The invention claimed is:

1. A stereo display device comprising:
 a display panel;
 a backlight having independently addressable portions;
 a shutter arrangement for a viewer, having independently controllable shutters for both eyes of the viewer; and
 a controller configured to control addressing of the display panel such that a stereo image is addressed in one field period, configured to control timing of operation of the independently controllable shutters, wherein a left eye image, a common eye image, and a right eye image are presented in sequence, and configured to control dimming of the backlight for the common eye image relative to the left and right eye images.

2. The display as claimed in claim 1, wherein the backlight is addressed at a faster speed than an addressing rate of the left and right eye images.

3. The display as claimed in claim 1, wherein the backlight is illuminated for 0.4-0.6 times a duration of a period allocated to each respective image.

4. The display as claimed in claim 1, wherein the shutters are controlled to allow light to both eyes during display of the common eye image.

5. The display as claimed in claim 4, wherein the controller is configured to control fractions of the frame period.

6. The display as claimed in claim 5, wherein the backlight is controlled such that, at any given time, all illuminated portions of the backlight present an identical image.

7. The display as claimed in claim 5, wherein the backlight is controlled such that, at any given time, a first set of illuminated portions of the backlight for presenting the identical image are at a first brightness and a second set of illuminated portions of the backlight for presenting either a next or a previous image or during addressing are at a second brightness, wherein the second brightness is lower than the first brightness.

8. A method of operating a stereo display device, comprising:
   addressing a display such that a stereo image is addressed in one field period by presenting a left eye image, a common eye image, and a right eye image in sequence with line-by-line addressing;
   controlling dimming of a backlight for the common eye image relative to the left eye image and the right eye image; and
   controlling a shutter arrangement for a viewer by opening a shutter associated with one eye of the viewer when the respective image for that eye is displayed.

9. The method as claimed in claim 8, further comprising:
   addressing the backlight at a faster speed than the addressing rate of the images.

10. The method as claimed in claim 8, comprising:
    illuminating the backlight for 0.4-0.6 times a duration of a period allocated to the respective image.

11. The method as claimed in claim 8, comprising:
    controlling the shutters to allow light to both eyes during the display of the common eye image.

12. The method as claimed in claim 11, comprising controlling fractions of the frame period.

13. A computer program product stored on a non-transitory computer-readable medium which is configured to perform all of the steps of claim 8 when said program is run on a computer.

14. The display as claimed in claim 1, wherein each field comprises a left eye image addressed twice in succession and a right eye image addressed twice in succession, and the backlight is illuminated for 0.6-0.9 times the duration of a combined period allocated to each respective image.

15. The display as claimed in claim 1, wherein each field comprises one left eye image, two common eye images, and one right eye image, and the shutters are controlled to allow light to both eyes during the two common eye images.

16. The display as claimed in claim 1, wherein each field comprises two left eye images, one common eye image, and two right eye images, and the shutters are controlled to allow light to both eyes during the one common eye image.

17. The method as claimed in claim 8, comprising:
    providing, within each field, a left eye image addressed twice in succession and a right eye image addressed twice in succession; and
    illuminating the backlight for 0.6-0.9 times the duration of the combined period allocated to the respective image.

18. The method as claimed in claim 8, comprising:
    providing, within each field, one left eye image, two common eye images, and one right eye image; and
    controlling the shutters to allow light to both eyes during the two common eye images.

19. The method as claimed in claim 8, comprising:
    providing, within each field, two left eye images, one common eye image, and two right eye images; and
    controlling the shutters to allow light to both eyes during the one common eye image.

20. A method of operating a stereo display device, comprising:
    addressing a display such that a stereo image is addressed in one field period by presenting a left eye image, a common eye image, and a right eye image in sequence with line-by-line addressing;
    controlling a backlight in line-by-line manner of the images;
    controlling a shutter arrangement for a viewer by opening a shutter associated with one eye of the viewer when the respective image for that eye is displayed; and
    subtracting extra light generated by images of left and right subfields from an image of common subfields.

* * * * *